United States Patent
Bluestein

(10) Patent No.: US 10,846,197 B1
(45) Date of Patent: Nov. 24, 2020

(54) SYSTEMS AND METHODS FOR DEBUGGING MIXED-LANGUAGE APPLICATIONS

(71) Applicant: Facebook, Inc., Menlo Park, CA (US)

(72) Inventor: Eric Bluestein, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 43 days.

(21) Appl. No.: 16/218,514

(22) Filed: Dec. 13, 2018

(51) Int. Cl.
  *G06F 11/36* (2006.01)
  *G06F 8/40* (2018.01)
(52) U.S. Cl.
  CPC ............ *G06F 11/3624* (2013.01); *G06F 8/40* (2013.01); *G06F 11/3664* (2013.01)
(58) Field of Classification Search
  CPC ..... G06F 11/3624; G06F 11/3664; G06F 8/40
  See application file for complete search history.

(56) References Cited

U.S. PATENT DOCUMENTS

| | | | | |
|---|---|---|---|---|
| 5,845,121 A * | 12/1998 | Carter | ..................... | G06F 8/437 717/131 |
| 5,901,315 A * | 5/1999 | Edwards | ............. | G06F 11/3664 703/22 |
| 6,353,923 B1 * | 3/2002 | Bogle | ................. | G06F 9/45512 714/E11.21 |
| 9,652,364 B1 * | 5/2017 | Kaila | .................. | G06F 11/3688 |
| 10,740,217 B1 * | 8/2020 | Stupachenko | .......... | G06F 9/541 |
| 2005/0015236 A1 * | 1/2005 | Wain | ........................ | G06F 8/20 704/1 |
| 2005/0034104 A1 * | 2/2005 | Pugh | .................... | G06F 11/3664 717/124 |
| 2008/0263522 A1 * | 10/2008 | Fung | .................... | G06F 11/3632 717/125 |
| 2009/0307652 A1 * | 12/2009 | Maybee | .............. | G06F 11/3644 717/104 |
| 2010/0162212 A1 * | 6/2010 | Stall | ..................... | G06F 11/3664 717/124 |

(Continued)

OTHER PUBLICATIONS

Jan Vran'y et al., "Multilanguage Debugger Architecture", [Online], pp. 1-12, [Retrieved from lnternt on Mar. 23, 2020], <http://users.fit.cvut.cz/-vranyj1/data/papers/Vrany10a-unified-debugger.pdf> Year: 2010.*

(Continued)

*Primary Examiner* — Ziaul A Chowdhury
(74) *Attorney, Agent, or Firm* — FisherBroyles, LLP

(57) ABSTRACT

A computer-implemented method for debugging mixed-language applications may include (i) determining that an application includes code written in least two programming languages, (ii) identifying, in response to determining that the application includes the code written in the at least two programming languages, a language-agnostic debugger that integrates dynamically specified language-specific debuggers via a common debugger protocol, (iii) configuring the language-agnostic debugger to, for each of the at least two programming languages in which the application is written, integrate a language-specific debugger for the programming language, and (iv) debugging the application using the language-agnostic debugger that integrates the language-specific debuggers for the at least two programming languages. Various other methods, systems, and computer-readable media are also disclosed.

16 Claims, 8 Drawing Sheets

(56) References Cited

U.S. PATENT DOCUMENTS

| | | | | |
|---|---|---|---|---|
| 2012/0017202 A1* | 1/2012 | Eguchi | ................... | G06F 8/51 |
| | | | | 717/137 |
| 2012/0331351 A1* | 12/2012 | Davis | ................. | G06F 11/3664 |
| | | | | 714/38.1 |
| 2016/0062870 A1* | 3/2016 | Menahem | ........... | G06F 11/3664 |
| | | | | 717/125 |
| 2016/0246700 A1* | 8/2016 | Pechanec | ............ | G06F 11/3624 |
| 2019/0146898 A1* | 5/2019 | Silva | ....................... | G06F 9/543 |
| | | | | 717/129 |
| 2019/0340103 A1* | 11/2019 | Nelson | ................ | G06F 11/3624 |

OTHER PUBLICATIONS

Charles 2, Mitchell et al., "Engineering VAX Ada for a Multi-Language Programming Environment", [Online], pp. 49-58, [Retrieved from Internet on Aug. 31, 2020], <https://dl.acm.org/doi/pdf/10.1145/24208.24215> (Year: 1987).*

Ricky T. Lindeman et al, "Declaratively Defining Domain-Specific Language Debuggers", [Online], pp. 127-136, [Retrieved from Interent on Aug. 31, 2020], <https://dl.acm.org/doi/pdf/10.1145/2189751.2047885> (Year: 2011).*

Paul Maybee, "pdb: A Network Oriented Symbolic Debugger", [Online], pp. 41-52, [Retrieved from Internet on Aug. 31, 2020], <https://www.cs.tufts.edu/~nr/cs257/archive/paul-maybee/pdb-network-debugger.pdf>, (Year: 1990).*

* cited by examiner

SYSTEMS AND METHODS FOR DEBUGGING MIXED-LANGUAGE APPLICATIONS

BACKGROUND

Debugging is a crucial step of application development. A typical debugger may have a variety of functions that make it easier to locate bugs, such as stepping through code, stepping into functions, setting breakpoints, and tracking variables. However, traditional debuggers may be written to debug applications written in a single programming language. When an application is written in multiple programming languages or makes calls to components written in other programming languages, a traditional debugger may be unable to step into the code written in the additional languages or track data passed between components written in different languages. The resulting opacity of the parts of the application written in additional languages may make debugging an application difficult, especially if the error turns out to involve data passed between components written in different languages.

Some debuggers may solve this problem by combining debuggers for two different programming languages. However, these debuggers may be hard-coded to only debug those two particular languages. If an application is written in a different combination of languages, a new mixed-language debugger must be created by hand. It may be inefficient and time-consuming to create specific mixed-language debuggers for each combination of programming languages. Accordingly, the instant disclosure identifies and addresses a need for additional and improved systems and methods for debugging mixed-language applications.

SUMMARY

As will be described in greater detail below, the instant disclosure describes systems and methods for debugging mixed-language applications using a language-agnostic debugger capable of integrating dynamically specified language-specific debuggers with little or no manual configuration.

In one example, a computer-implemented method for debugging mixed-language applications may include (i) determining that an application includes code written in least two programming languages, (ii) identifying, in response to determining that the application includes the code written in the at least two programming languages, a language-agnostic debugger that integrates dynamically specified language-specific debuggers via a common debugger protocol, (iii) configuring the language-agnostic debugger to, for each of the at least two programming languages in which the application is written, integrate a language-specific debugger for the programming language, and (iv) debugging the application using the language-agnostic debugger that integrates the language-specific debuggers for the at least two programming languages.

In one embodiment, determining that the application includes code written in at least two programming languages may include determining that the application includes code written in at least three programming languages and configuring the language-agnostic debugger to, for each of the at least two programming languages in which the application is written, integrate the language-specific debugger for the programming language may include configuring the language-agnostic debugger to, for each of the at least three programming languages in which the application is written, integrate a language-specific debugger for the programming language. In some examples, configuring the language-agnostic debugger to, for each of the at least two programming languages in which the application is written, integrate the language-specific debugger for the programming language may include, for at least one language-specific debugger, identifying a set of debugging instructions used by the language-specific debugger and translating the set of debugging instructions into the common debugger protocol. In some embodiments, debugging the application using the language-agnostic debugger that integrates the language-specific debuggers for the at least two programming languages may include enabling a user to debug the application via a same user interface for each of the at least two programming languages.

In some examples, debugging the application using the language-agnostic debugger that integrates the language-specific debuggers for the at least two programming languages may include determining that at least one language-specific debugger is a native debugger for a platform on which the application is being debugged and injecting, via the native debugger, code into the application that facilitates debugging of the application on the platform by the language-agnostic debugger. In one embodiment, injecting, via the native debugger, the code into the application that facilitates debugging of the application on the platform by the language-agnostic debugger may include translating, by the debugger, high-level code into machine code. In one embodiment, the code may facilitate debugging of the application on the platform by the language-agnostic debugger by notifying the language-agnostic debugger when the application transitions between executing application code written in different programming languages.

In some examples, debugging the application using the language-agnostic debugger that integrates the language-specific debuggers for the at least two programming languages may include tracking a value of at least one variable passed from code written in a first programming language to code written in a second programming language. In one example, debugging the application using the language-agnostic debugger that integrates the language-specific debuggers for the at least two programming languages may include detecting that a user is stepping through code written in a first programming language and enabling the user to step into a function written in a second programming language.

In one embodiment, a system for implementing the above-described method may include at least one physical processor and physical memory that includes computer-executable instructions that, when executed by the physical processor, cause the physical processor to (i) determine that an application includes code written in least two programming languages, (ii) identify, in response to determining that the application includes the code written in the at least two programming languages, a language-agnostic debugger that integrates dynamically specified language-specific debuggers via a common debugger protocol, (iii) configure the language-agnostic debugger to, for each of the at least two programming languages in which the application is written, integrate a language-specific debugger for the programming language, and (iv) debug the application using the language-agnostic debugger that integrates the language-specific debuggers for the at least two programming languages.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that an application includes code written in least two programming languages, (ii) identify, in response to determining that the application includes the code written in the at least two programming languages, a language-agnostic debugger that integrates dynamically specified language-specific debuggers via a common debugger protocol, (iii) configure the language-agnostic debugger to, for each of the at least two programming languages in which the application is written, integrate a language-specific debugger for the programming language, and (iv) debug the application using the language-agnostic debugger that integrates the language-specific debuggers for the at least two programming languages.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
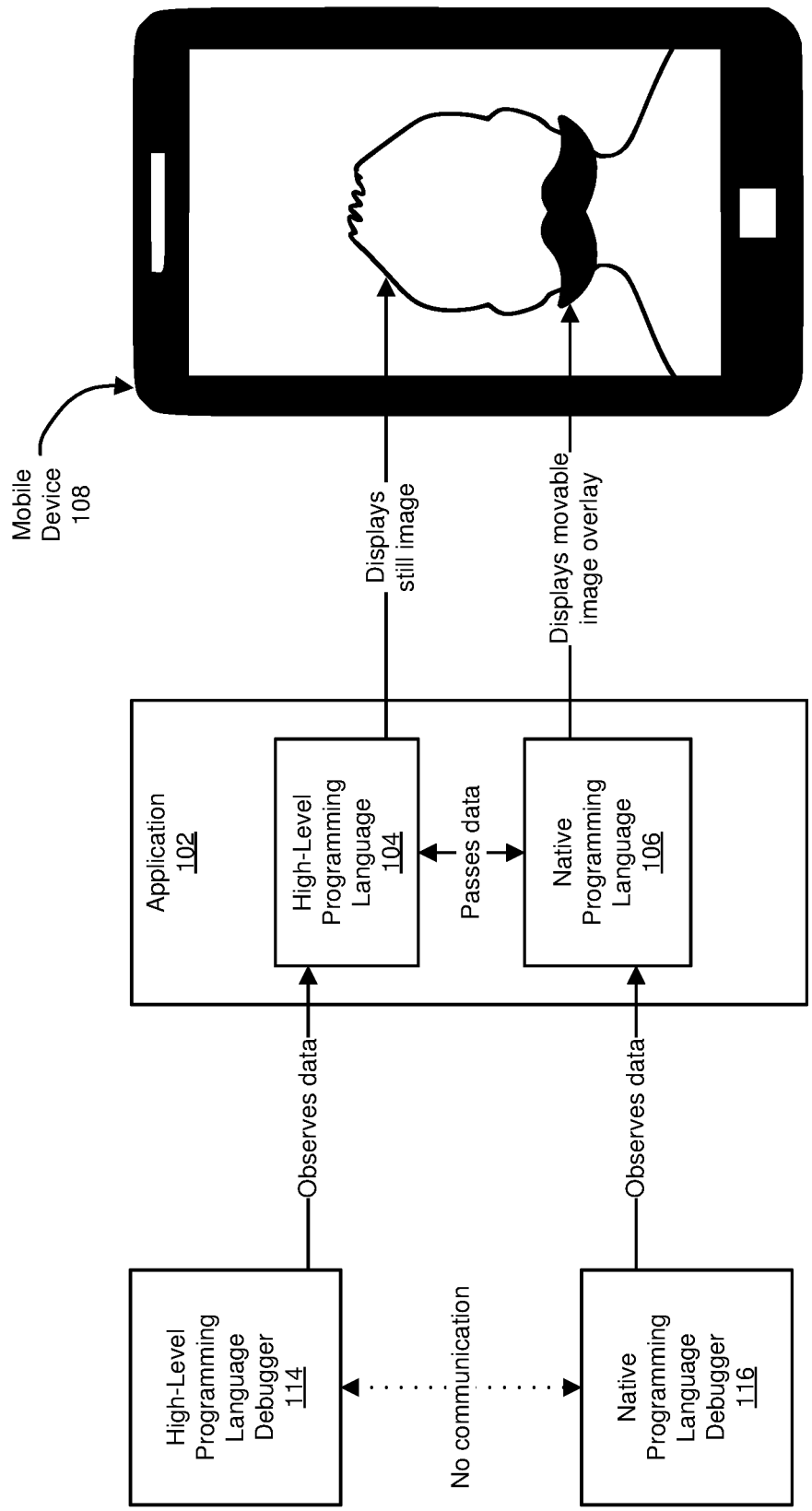
FIG. 1 is an illustration of an exemplary mixed-language application.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for debugging mixed-language applications. As will be explained in greater detail below, embodiments of the instant disclosure may enable developers to debug mixed-language applications easily and efficiently by dynamically configuring a language-agnostic debugger with any language-specific debuggers relevant to debugging a particular application. In some embodiments, the language-agnostic debugger may include a native debugger to the operating system on which the application is being debugged, enabling the language-agnostic debugger to inject arbitrary code into the application, improving the ability of the language-agnostic debugger to monitor the execution of the application for transitions between components written in different languages. By using a native debugger to inject code, the language-agnostic debugger may be able to debug applications on platforms that are otherwise opaque to the language-agnostic debugger, such as platforms that don't expose an interface that allows debuggers to intercept application function calls. Additionally, by injecting code into the application, the debugger may be able to debug production versions of applications rather than only debugging specially compiled versions with built-in debugger code. In some embodiments, the systems described herein may improve the functioning of a computing device by improving the ability of developers to debug applications on and/or via the computing device, leading to a reduction in bugs in applications on the computing device. Additionally, the systems described herein may improve the fields of debugging and/or software development by enabling developers to more easily and efficiently debug mixed-language applications across various platforms.

FIG. 1 illustrates an exemplary mixed-language application. In some examples, the term "mixed-language application," as used herein, may refer to any application that has components written in more than one programming language and/or incorporates libraries and/or other types of modules written in at least one programming language other than the language in which the main application is written. As illustrated in FIG. 1, in one example, a mobile device 108 may be configured with an application 102 that enables a user to place a moveable image overlay on a still image. In some examples, application 102 may have components written in a high-level programming language 104 (e.g., the components that display the still image and/or user interface) and/or a native programming language 106 (e.g., components that produce moving graphics and/or video that may gain performance improvements from being written in a native programming language). In some examples, term "native programming language," as used herein, may generally refer to any programming language understood by the computing device without being compiled and/or interpreted, such as assembly and/or machine code, and/or any programming language that is compiled into machine-specific code that may be run by the physical processor without interpretation. Similarly, the term "native debugger," as used herein, may generally refer to any debugger for a native programming language on a given platform. In some examples, the term "high-level programming language," as used herein, may refer to a programming language that is translated by a compiler and/or interpreter, executed within a virtual machine, compiled into intermediate bytecode, and/or uses just-in-time compilation.

In some examples, a developer attempting to debug application 102 may use a high-level programming language debugger 114 to debug the components written in high-level programming language 104 and/or a native programming language debugger 116 to debug the components written in native programming language 116. In some embodiments, the two debuggers may be separate and/or may not communicate, making it inefficient and time-consuming to jump between different parts of application 102 while looking for a bug. Additionally, it may be difficult to track data passed between different components of the application.

Figure 2:
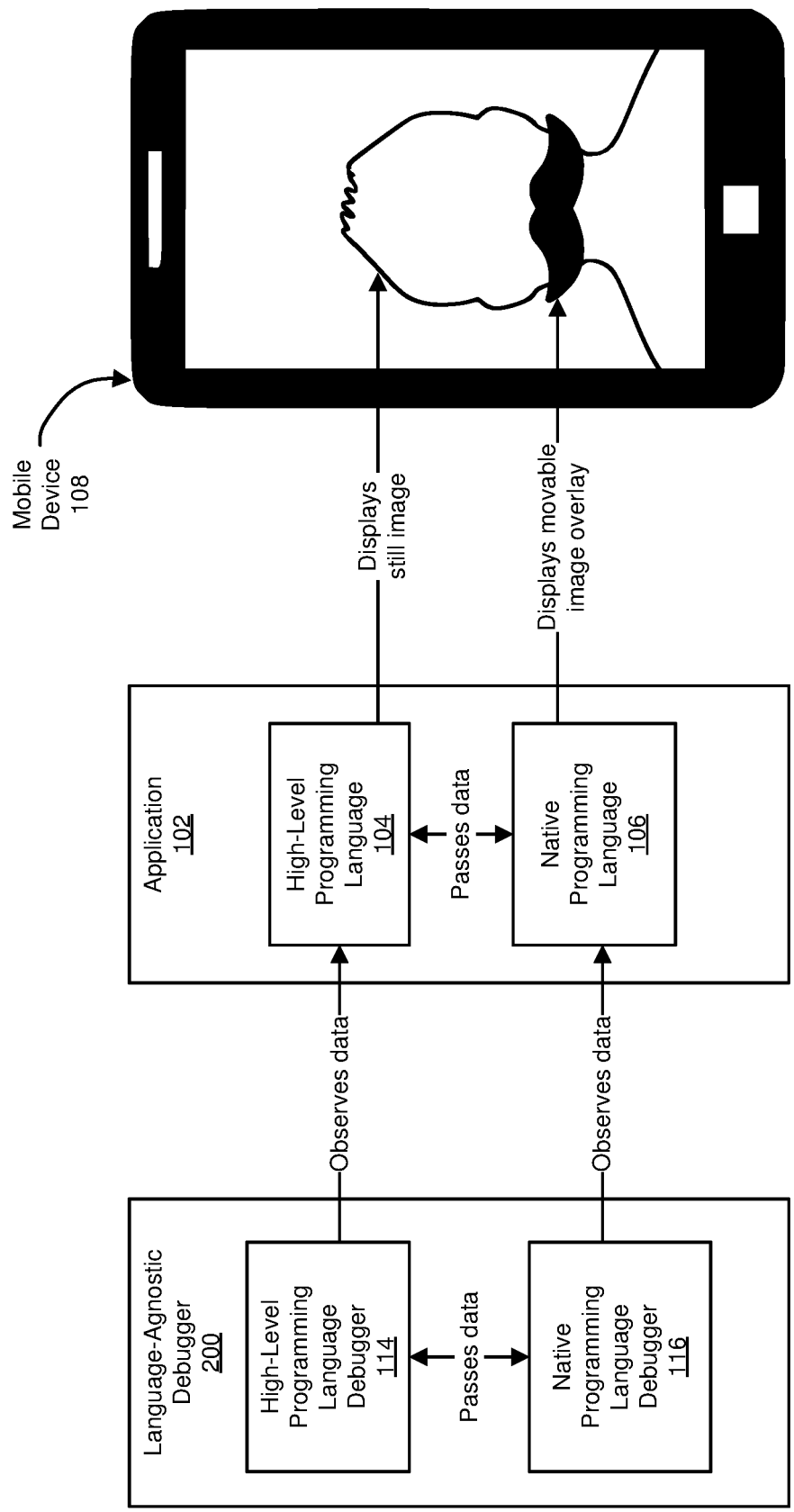
FIG. 2 is an illustration of an exemplary system for debugging mixed-language applications.

FIG. 2 illustrates an example system for debugging mixed-language applications. As illustrated in FIG. 2, a language-agnostic debugger 200 may debug application 102 by providing a generic wrapper that integrates with both high-level programming language debugger 114 and native programming language debugger 116. In some embodiments, language-agnostic debugger 200 may pass data between high-level programming language debugger 114 and native programming language debugger 116, facilitating the debugging of issues that arise when faulty data is passed between components and/or data is transformed incorrectly when being passed between components. In one embodiment, language-agnostic debugger 200 may monitor when different parts of the application are being debugged, seamlessly switching between integrated language-specific debuggers. In some embodiments, language-agnostic debugger 200 may display the same user interface when debugging different components, further improving the user experience of language-agnostic debugger 200.

Figure 3:
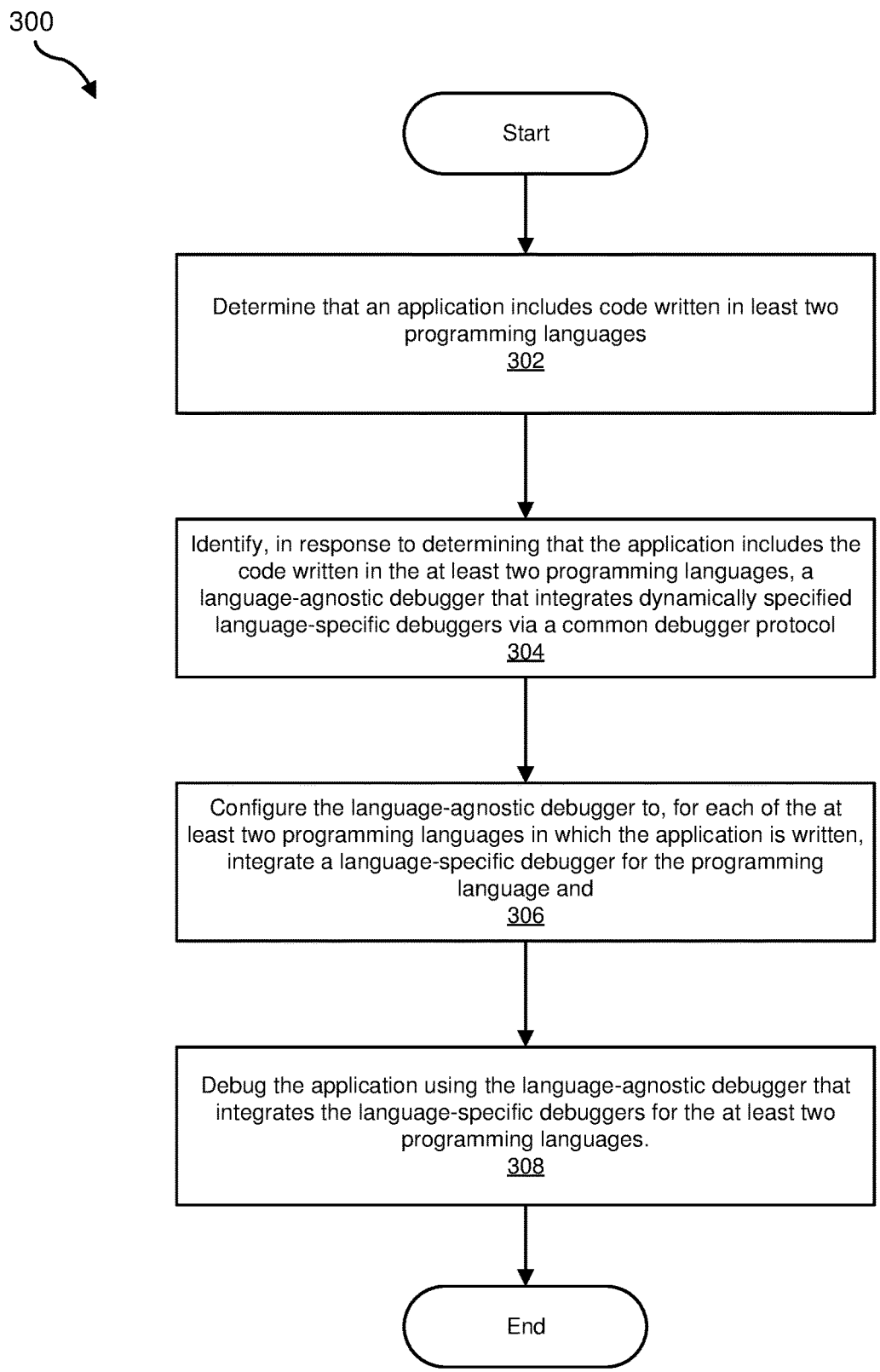
FIG. 3 is a flow diagram of an exemplary method for debugging mixed-language applications.

FIG. 3 is a flow diagram of an exemplary method for debugging mixed-language applications. As illustrated in FIG. 3, at step 302, one or more of the systems described herein may determine that an application includes code written in least two programming languages. In some embodiments, the systems described herein may automatically detect the programming languages in which code is written (e.g., by examining file extensions and/or performing text analysis). In some embodiments, the systems described herein may use a native debugger to detect the programming languages in which code is written, for example by detecting predetermined named modules and/or libraries. Additionally or alternatively, a user may specify which programming languages are present in an application.

At step 304, one or more of the systems described herein may identify, in response to determining that the application includes code written in at least two programming languages, a language-agnostic debugger that integrates dynamically specified language-specific debuggers via a common debugger protocol. For example, the systems described herein may automatically suggest the language-agnostic debugger in response to determining that a user is attempting to debug an application that includes multiple programming languages.

At step 306, one or more of the systems described herein may configure the language-agnostic debugger to, for each of the programming languages in which the application is written, integrate a language-specific debugger for the programming language. For example, the systems described herein may automatically locate a previously-integrated language-specific debugger for the programming language. In other examples, the systems described herein may determine that the language-specific debugger uses a common debugger protocol with the language-agnostic debugger and may automatically integrate the language-specific debugger. In some examples, the systems described herein may prompt a user to provide information about a debugger protocol and/or command syntax used by the language-specific debugger in order to integrate the language-specific debugger.

At step 308, one or more of the systems described herein may debug the application using the language-agnostic debugger that integrates the language-specific debuggers for the at least two programming languages. For example, the systems described herein may enable a user to set breakpoints, step through, over and/or into code, start application execution, pause application execution, stop application execution, monitor variable values, set variable values, and/or otherwise perform the typical functions expected of a debugger.

Figure 4:
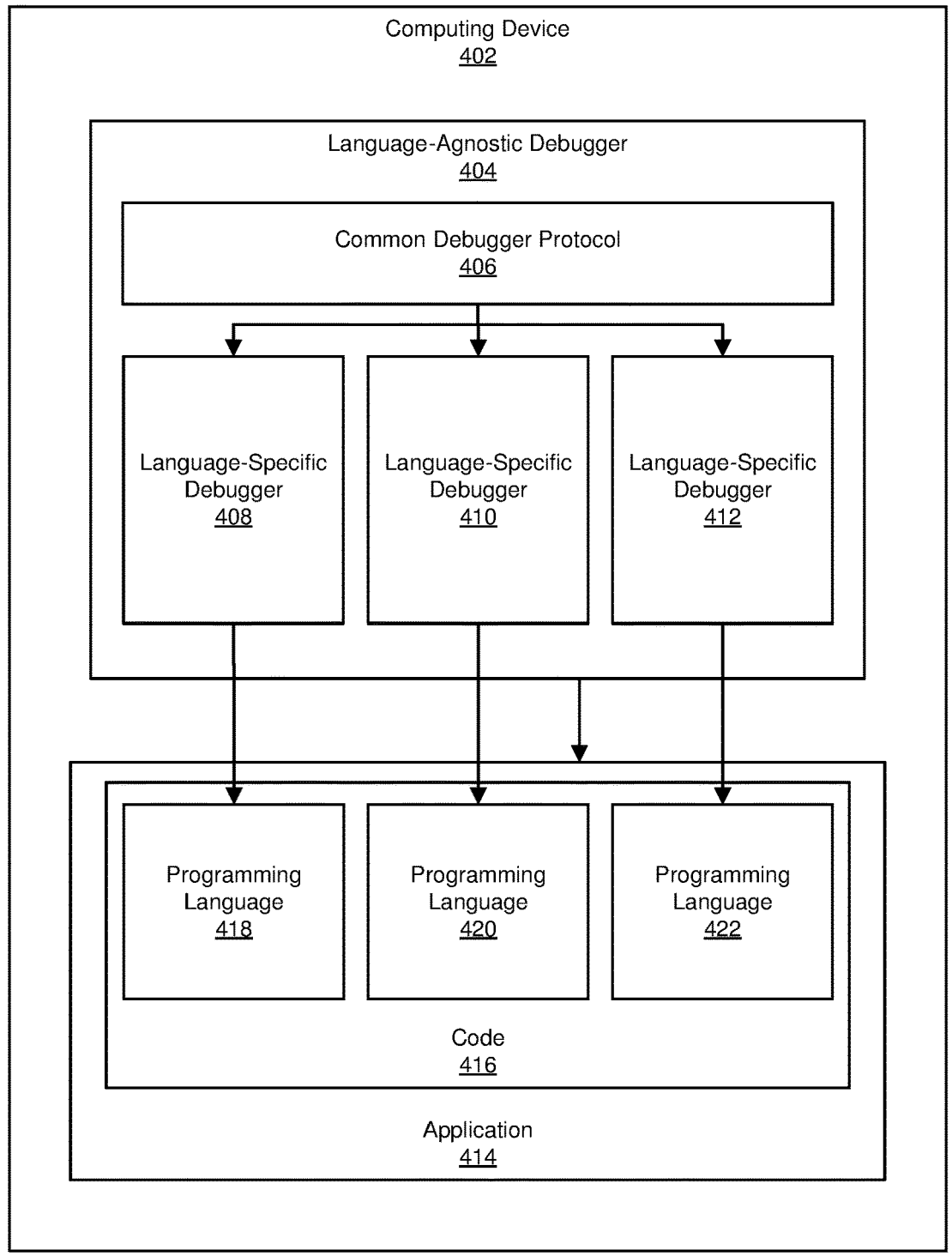
FIG. 4 is a block diagram of an exemplary system for debugging mixed-language applications.

FIG. 4 is a block diagram of an exemplary system for debugging mixed-language applications. In some embodiments, a computing device 402 may be configured with a language-agnostic debugger 404. In some examples, computing device 402 may include a development environment. In other examples, computing device 402 may be a production device (e.g., a device that is accessible to end users). Examples of computing device 402 may include, without limitation, personal computing devices, mobile computing devices, wearable devices, smart appliances, and/or servers. In some embodiments, language-agnostic debugger 404 may include language-specific debuggers for multiple languages, such as language-specific debuggers 408, 410, and/or 412. In some examples, language-agnostic debugger may include various numbers of language-specific debuggers, such as two, three, four, or more language-specific debuggers. In one example, each of language-specific debuggers 408, 410, and/or 412 may correspond to a programming language within code 416 of an application 414, such as programming languages 418, 420, and/or 422. In some embodiments, language-specific debuggers 408, 410, and/or 412 may communicate with each other and/or a wrapper within language-agnostic debugger 404 via a common debugger protocol 406 that uses the same commands for common debugging actions such as setting break points, stepping into functions, and so forth. By using common debugger protocol 406 to communicate with different debuggers, language-agnostic debugger 404 may dynamically integrate debuggers for different languages while providing a consistent user interface.

Figure 5:
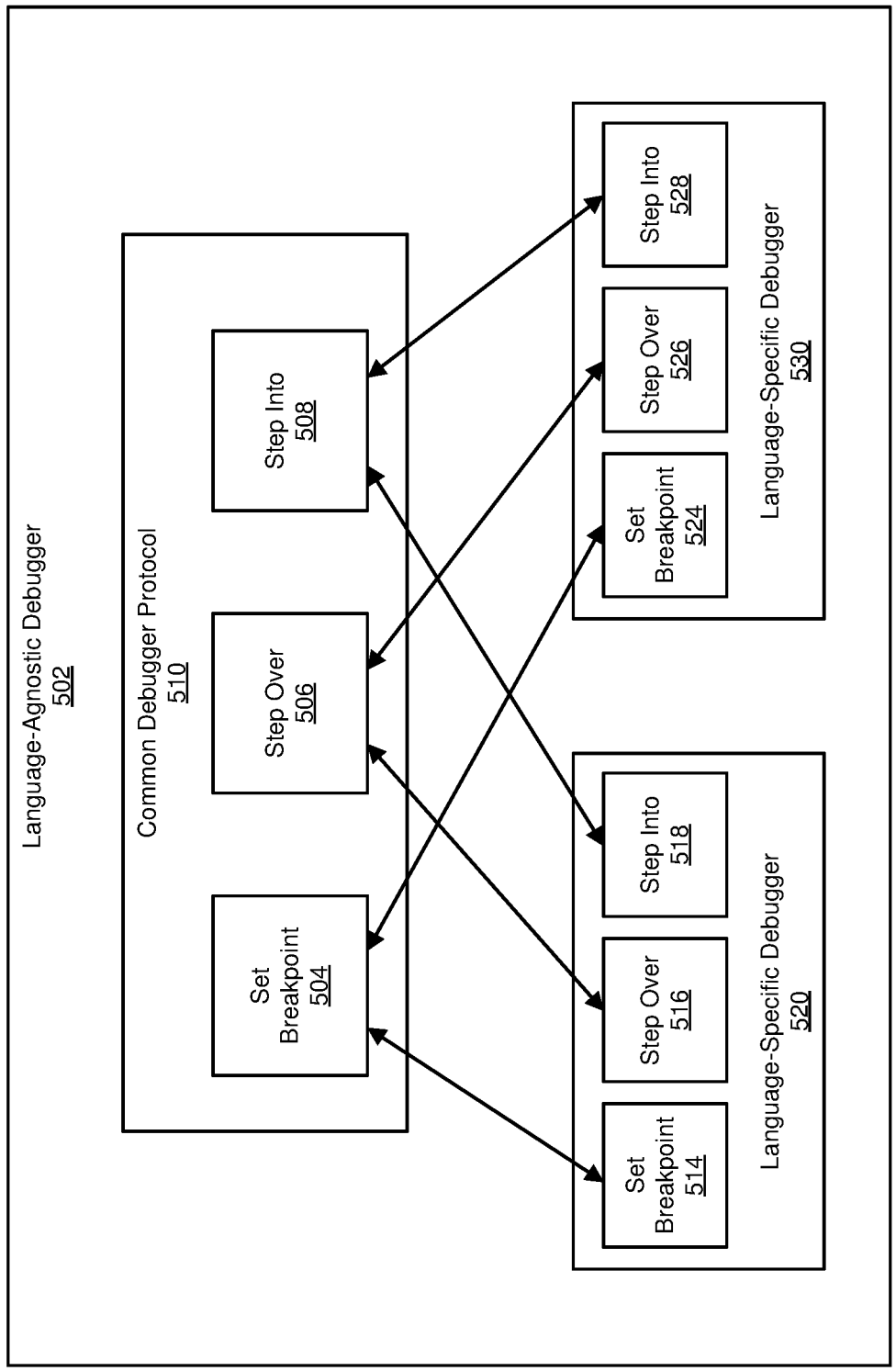
FIG. 5 is a block diagram of an exemplary system for debugging mixed-language applications.

FIG. 5 is a block diagram of an exemplary system for debugging mixed-language applications using a common debugger protocol. In some examples, a language-agnostic debugger 502 may use a common debugger protocol 510 to communicate with multiple language-specific debuggers, such as language specific debuggers 520 and 530. In some embodiments, the common debugger protocol may be a publicly defined standard. In other embodiments, the common debugger protocol may be a custom protocol. In one example, language-agnostic debugger 502 may receive input from a user to set a breakpoint in an application. In this example, language-agnostic debugger may receive set breakpoint 504 in common debugger protocol 510 and may then translate that command into set breakpoint 514 and/or set breakpoint 524, depending on whether language specific-debugger 520 or language-specific debugger 530 is the appropriate debugger for the language of the code in which to set the breakpoint. Similarly, language-agnostic debugger 502 may translate step over 506 and/or step into 508 into step over 516 and/or 526 and/or step into 518 and/or 528, respectively. In some examples, language-specific debugger 520 may already use common debugger protocol 510 and language-agnostic debugger 502 may automatically integrate language-specific debugger 520. In other examples, language-specific debugger 520 may use a different debugger protocol and/or command syntax and language-agnostic debugger 502 may integrate language-specific debugger 520 by prompting a user to provide the commands used by language-specific debugger 520 to perform various tasks, such as set breakpoint 514, step over 516, and/or step into 518. In this example, language-specific debugger 502 may then store those commands and translate commands from common debugger protocol 510 into the other debugger protocol and/or command syntax when sending commands to language-specific debugger 520.

In one embodiment, language-agnostic debugger 502 may include a command line interface (CLI) that enables a user to enter commands. By using the common debugger protocol and translating commands to those relevant to each debugger, language-agnostic debugger 502 may enable a user to enter the same CLI command to perform the same function in each language rather than requiring the user to remember which command performs each function in each language. Additionally or alternatively, language-agnostic debugger 502 may provide a graphical user interface (GUI) for the user to input commands.

Figure 6:
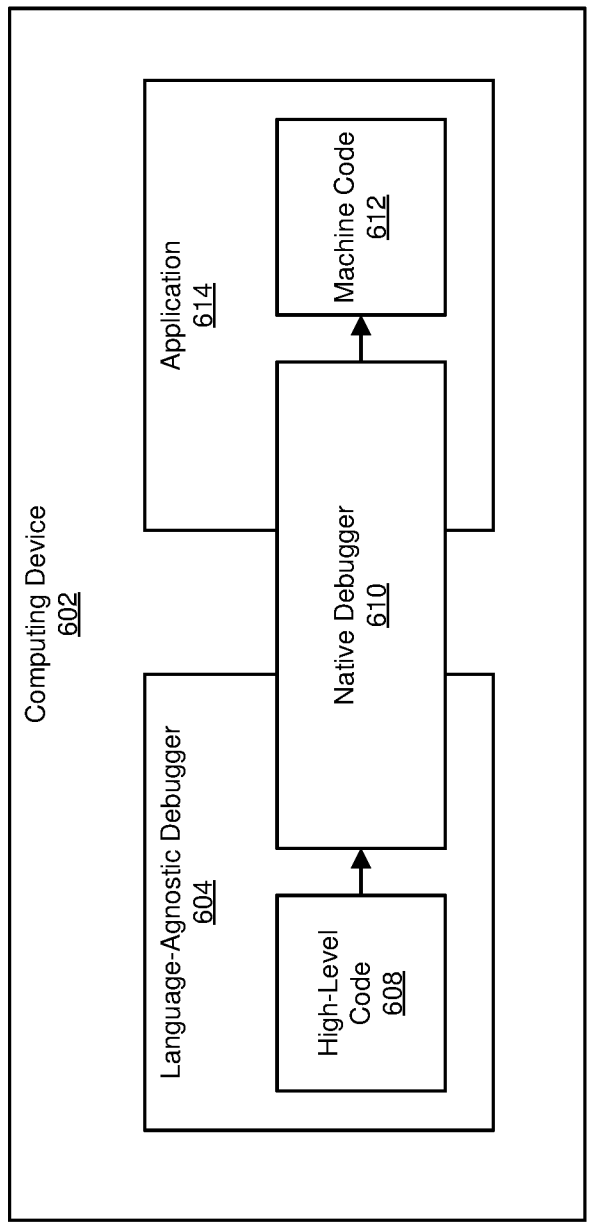
FIG. 6 is a block diagram of an exemplary system for debugging mixed-language applications.

FIG. 6 is a block diagram of an exemplary system for debugging mixed-language applications by using a native debugger to inject code into an application. As illustrated in FIG. 6, a computing device 602 may host an application 614 and a language-agnostic debugger 604. In some examples, application 614 may be a production version application and/or version of an application that is compiled without debugging code. In some embodiments, native debuggers to an operating system may be capable of injecting code into applications running on that operating system. In one example, language-agnostic debugger 604 may, via native debugger 610, inject application 614 with machine code 612 that facilitates debugging. In some embodiments, native debugger 610 may produce machine code 612 by, at the prompting of language-agnostic debugger 604, translating high-level code 608. By translating high-level code into machine code, the language-agnostic debugger may enable a user to write a single instance of code in a relatively user-friendly programming language rather than having to write individual instances of machine code tailored to each operating system. Additionally, by using a native debugger to inject code into the application at runtime, the language-agnostic debugger may be able to debug applications on opaque runtimes, virtual machine environments, and/or operating systems that do not expose interfaces for debugging applications and/or do not allow debuggers to intercept function calls from applications. In some examples, the injected code may enable the language-agnostic debugger to debug parts of the application not written in the programming language associated with the language-specific native debugger and/or may enable the language-agnostic debugger to monitor application transitions between code written in different programming languages.

Figure 7:
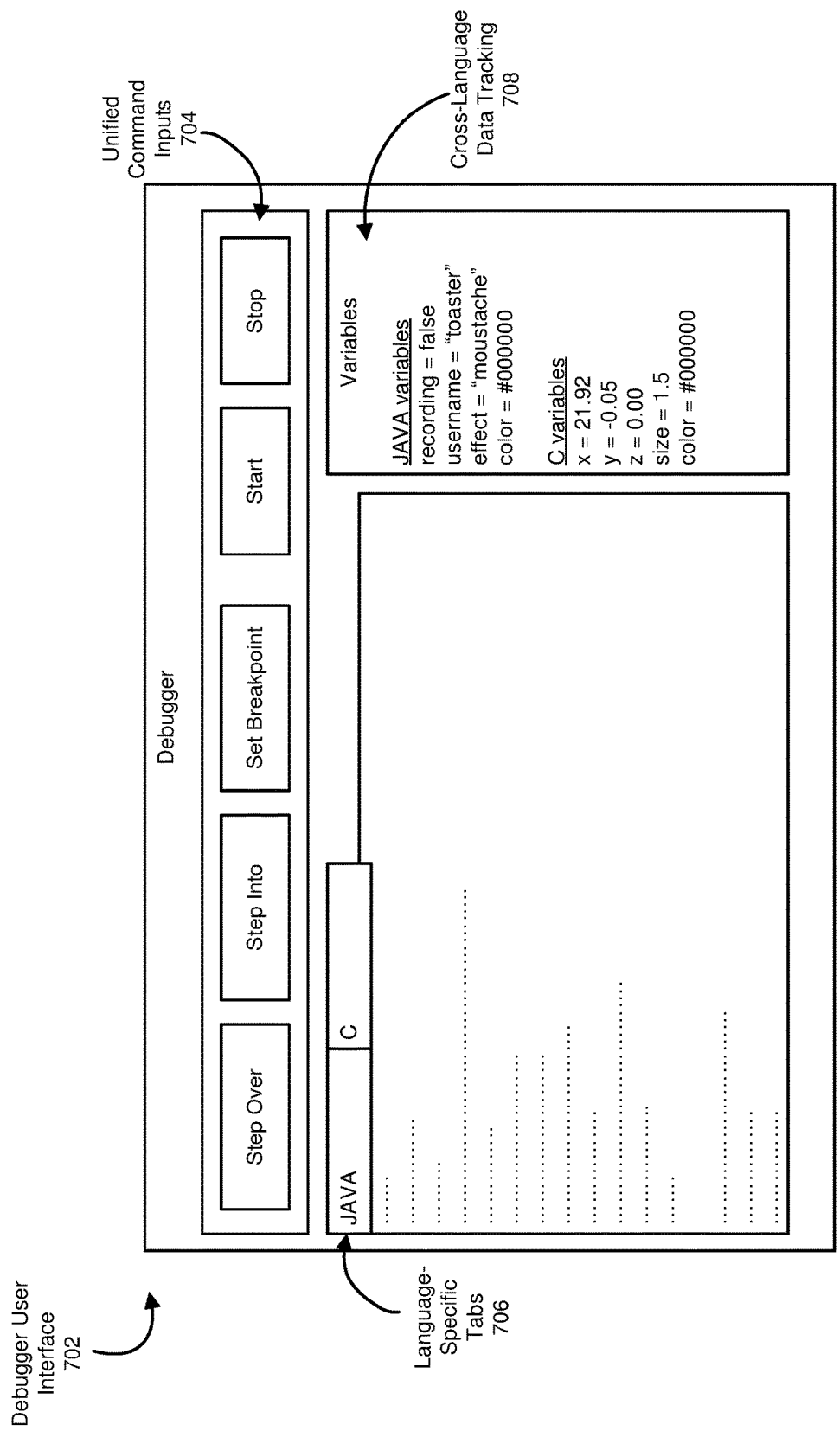
FIG. 7 is an illustration of an exemplary user interface for debugging mixed-language applications.

FIG. 7 is an illustration of an exemplary user interface for debugging mixed-language applications. In some embodiments, the systems described herein may provide a user with a unified GUI for debugging mixed-language applications. As illustrated in FIG. 7, a debugger user interface 702 may include various options for giving commands, viewing code, and/or tracking variables. In some embodiments, a user may use the same input options, tools, and/or window configuration in debugger user interface 702 when debugging parts of an application written in different programming languages, rather than switching between each language-specific debuggers' standard user interface. In one embodiment, debugger user interface 702 may include unified command inputs 704 that enable a user to issue commands to different language-specific debuggers using the same button on a graphical user interface. For example, a user may hit the "step into" button to step into functions written in any language. In some embodiments, debugger user interface 702 may include language-specific tabs 706 that enable a user to tab between portions of an application written in different languages while maintaining the same graphical user interface. In one embodiment, debugger user interface 702 may include a panel for cross-language data tracking 708 that shows variables and/or other data from multiple parts of the application. In some examples, cross-language data tracking 708 may simultaneously display all tracked data. In other examples, cross-language data tracking 708 may include tabs for data associated with different portions of the application.

Figure 8:
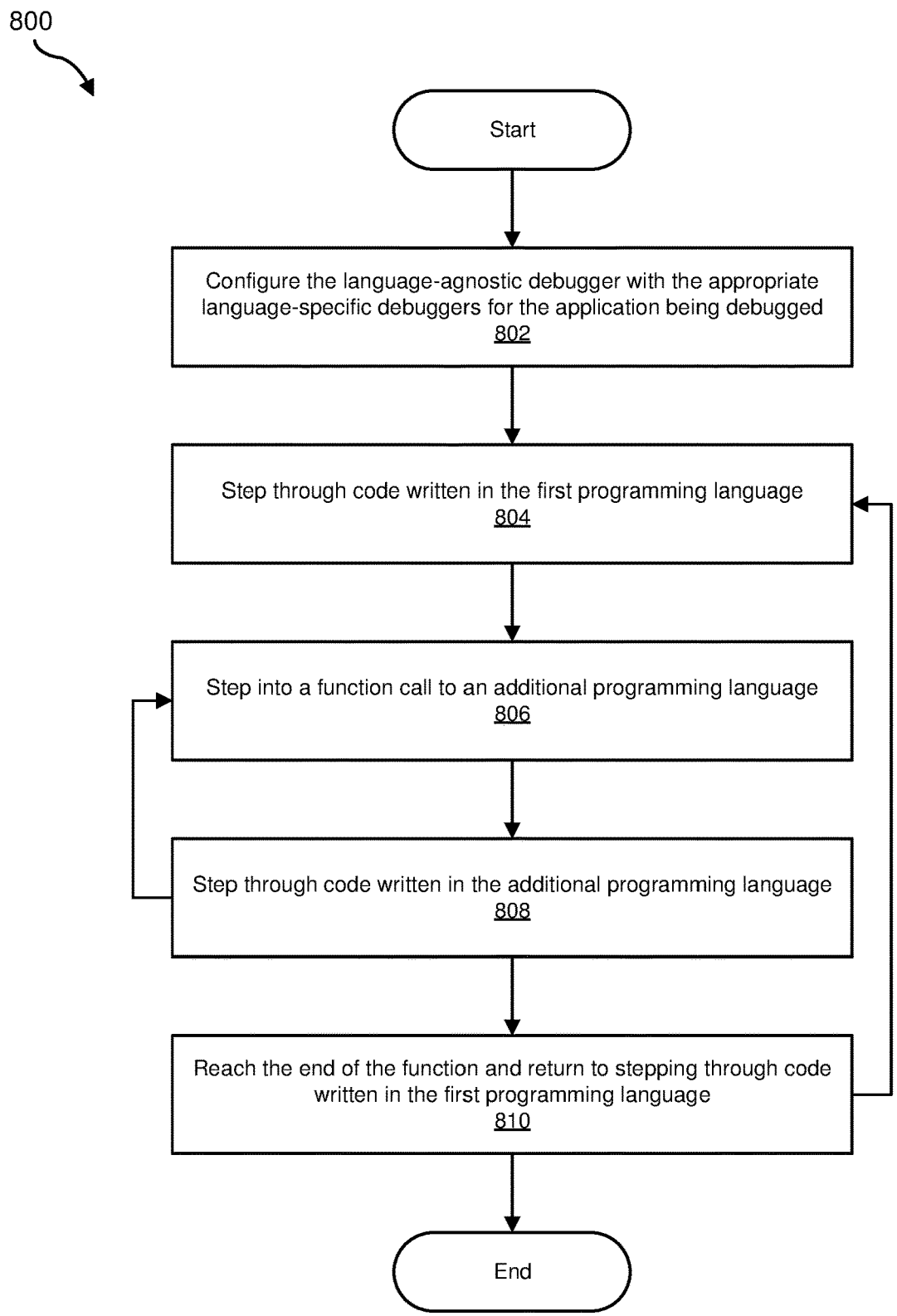
FIG. 8 is a flow diagram of an exemplary method for debugging mixed-language applications via a language-agnostic debugger.

FIG. 8 is a flow diagram of an exemplary method for debugging mixed-language applications via a language-agnostic debugger. In some examples, at step 802, a user may configure the language-agnostic debugger with the appropriate language-specific debuggers for the application being debugged. In some examples, the language-agnostic debugger may automatically integrate the language-specific debuggers while in other examples, the user may perform some manual configuration tasks such as specifying the input expected by the language-specific debugger to perform various commands. At step 804, the language-agnostic debugger may enable the user to step through code written in the first programming language. A step 806, the language-agnostic debugger may enable the user to step into a function call to a library or other component written in an additional programming language. In some examples, the language-agnostic debugger may track data passed between the different-language components of the application. At step 808, the language-agnostic debugger may enable the user to step through code written in the additional programming language. In some examples, the language-agnostic debugger may enable the user to step into functions written in a third language and/or into functions written in the first language that are embedded within functions written in the additional language. At step 810, the language-agnostic debugger may enable the user to reach the end of the function and continue stepping through code written in the first programming language. In some examples, the language-agnostic debugger may enable the user to switch between components written in different languages in any order.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive debugger protocol data to be transformed, transform the debugger protocol data to match the debugger protocol with a common debugger protocol, output a result of the transformation to integrate multiple debuggers, use the result of the transformation to debug an application, and store the result of the transformation to continue using the integrated debugger. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining that an application comprises code written in least two programming languages;
   identifying, in response to determining that the application comprises the code written in the at least two programming languages, a language-agnostic debugger that integrates dynamically specified language-specific debuggers via a common debugger protocol;
   configuring the language-agnostic debugger to, for each of the at least two programming languages in which the application is written, integrate a language-specific debugger for the programming language; and
   debugging the application using the language-agnostic debugger that integrates the language-specific debuggers for the at least two programming languages by:
   determining that at least one language-specific debugger is a native debugger for a platform on which the application is being debugged; and
   injecting, via the native debugger, code into the application that facilitates debugging of the application on the platform by the language-agnostic debugger at least in part by notifying the language-agnostic debugger when the application transitions between executing application code written in different programming languages.

2. The computer-implemented method of claim 1, wherein:
   determining that the application comprises code written in the least two programming languages comprises determining that the application comprises code written in at least three programming languages; and
   configuring the language-agnostic debugger to, for each of the at least two programming languages in which the application is written, integrate the language-specific debugger for the programming language comprises configuring the language-agnostic debugger to, for each of the at least three programming languages in which the application is written, integrate a language-specific debugger for the programming language.

3. The computer-implemented method of claim 1, wherein configuring the language-agnostic debugger to, for each of the at least two programming languages in which the application is written, integrate the language-specific debugger for the programming language comprises, for at least one language-specific debugger:
   identifying a set of debugging instructions used by the language-specific debugger; and
   translating the set of debugging instructions into the common debugger protocol.

4. The computer-implemented method of claim 1, wherein injecting, via the native debugger, the code into the application that facilitates debugging of the application on the platform by the language-agnostic debugger comprises translating, by the debugger, high-level code into machine code.

5. The computer-implemented method of claim 1, wherein debugging the application using the language-agnostic debugger that integrates the language-specific debuggers for the at least two programming languages comprises tracking a value of at least one variable passed from code written in a first programming language to code written in a second programming language.

6. The computer-implemented method of claim 1, wherein debugging the application using the language-agnostic debugger that integrates the language-specific debuggers for the at least two programming languages comprises:
  detecting that a user is stepping through code written in a first programming language; and
  enabling the user to step into a function written in a second programming language.

7. The computer-implemented method of claim 1, wherein debugging the application using the language-agnostic debugger that integrates the language-specific debuggers for the at least two programming languages comprises enabling a user to debug the application via a same user interface for each of the at least two programming languages.

8. A system comprising:
  at least one physical processor;
  physical memory comprising computer-executable instructions that, when executed by the physical processor, cause the physical processor to:
    determine that an application comprises code written in least two programming languages;
    identify, in response to determining that the application comprises the code written in the at least two programming languages, a language-agnostic debugger that integrates dynamically specified language-specific debuggers via a common debugger protocol;
    configure the language-agnostic debugger to, for each of the at least two programming languages in which the application is written, integrate a language-specific debugger for the programming language; and
  debug the application using the language-agnostic debugger that integrates the language-specific debuggers for the at least two programming languages by:
    determining that at least one language-specific debugger is a native debugger for a platform on which the application is being debugged; and
    injecting, via the native debugger, code into the application that facilitates debugging of the application on the platform by the language-agnostic debugger at least in part by notifying the language-agnostic debugger when the application transitions between executing application code written in different programming languages.

9. The system of claim 8, wherein the computer-executable instructions cause the physical processor to:
  determine that the application comprises code written in the least two programming languages by determining that the application comprises code written in at least three programming languages; and
  configure the language-agnostic debugger to, for each of the at least two programming languages in which the application is written, integrate the language-specific debugger for the programming language by configuring the language-agnostic debugger to, for each of the at least three programming languages in which the application is written, integrate a language-specific debugger for the programming language.

10. The system of claim 8, wherein the computer-executable instructions cause the physical processor to configure the language-agnostic debugger to, for each of the at least two programming languages in which the application is written, integrate the language-specific debugger for the programming language by, for at least one language-specific debugger:
  identifying a set of debugging instructions used by the language-specific debugger; and
  translating the set of debugging instructions into the common debugger protocol.

11. The system of claim 8, wherein the computer-executable instructions cause the physical processor to inject, via the native debugger, the code into the application that facilitates debugging of the application on the platform by the language-agnostic debugger by translating, by the debugger, high-level code into machine code.

12. The system of claim 8, wherein the computer-executable instructions cause the physical processor to debug the application using the language-agnostic debugger that integrates the language-specific debuggers for the at least two programming languages by tracking a value of at least one variable passed from code written in a first programming language to code written in a second programming language.

13. The system of claim 8, wherein the computer-executable instructions cause the physical processor to debug the application using the language-agnostic debugger that integrates the language-specific debuggers for the at least two programming languages by:
  detecting that a user is stepping through code written in a first programming language; and
  enabling the user to step into a function written in a second programming language.

14. The system of claim 8, wherein the computer-executable instructions cause the physical processor to debug the application using the language-agnostic debugger that integrates the language-specific debuggers for the at least two programming languages by enabling a user to debug the application via a same user interface for each of the at least two programming languages.

15. A non-transitory computer-readable medium comprising one or more computer-readable instructions that, when executed by at least one processor of a computing device, cause the computing device to:
  determine that an application comprises code written in least two programming languages;
  identify, in response to determining that the application comprises the code written in the at least two programming languages, a language-agnostic debugger that integrates dynamically specified language-specific debuggers via a common debugger protocol;
  configure the language-agnostic debugger to, for each of the at least two programming languages in which the application is written, integrate a language-specific debugger for the programming language; and
  debug the application using the language-agnostic debugger that integrates the language-specific debuggers for the at least two programming languages by:
    determining that at least one language-specific debugger is a native debugger for a platform on which the application is being debugged; and
    injecting, via the native debugger, code into the application that facilitates debugging of the application on the platform by the language-agnostic debugger at least in part by notifying the language-agnostic debugger when the application transitions between executing application code written in different programming languages.

16. The non-transitory computer-readable medium of claim 15, wherein the one or more computer-readable instructions cause the computing device to:

determine that the application comprises code written in the least two programming languages comprises determining that the application comprises code written in at least three programming languages; and configure the language-agnostic debugger to, for each of the at least two programming languages in which the application is written, integrate the language-specific debugger for the programming language comprises configuring the language-agnostic debugger to, for each of the at least three programming languages in which the application is written, integrate a language-specific debugger for the programming language.

\* \* \* \* \*